United States Patent [19]

Andrew

[11] Patent Number: 5,788,790
[45] Date of Patent: Aug. 4, 1998

[54] METHOD FOR BUTT WELDING THERMOPLASTIC PIPE INCLUDING AUTOMATIC DRAG COMPENSATION

[75] Inventor: Bill Dean Andrew, Tulsa, Okla.

[73] Assignee: TDW Delaware, Inc., Wilmington, Del.

[21] Appl. No.: 782,365

[22] Filed: Jan. 13, 1997

[51] Int. Cl.[6] .................................................. B32B 31/00
[52] U.S. Cl. ........................... 156/64; 156/304.2; 156/358
[58] Field of Search .................................. 156/64, 304.2, 156/304.6, 358, 499, 503

[56] References Cited

U.S. PATENT DOCUMENTS

| | | | |
|---|---|---|---|
| 3,013,925 | 12/1961 | Larsen | 156/153 |
| 3,552,265 | 1/1971 | Lucas | 90/21 |
| 3,729,360 | 4/1973 | McElroy | 156/499 |
| 3,846,208 | 11/1974 | McElroy | 156/499 |
| 4,352,708 | 10/1982 | McElroy | 156/378 |
| 4,640,732 | 2/1987 | Stafford | 156/358 |
| 4,957,570 | 9/1990 | Jenkins et al. | 156/64 |
| 5,013,376 | 5/1991 | McElroy, II et al. | 156/64 |
| 5,169,264 | 12/1992 | Kimura | 405/184 |

Primary Examiner—David A. Simmons
Assistant Examiner—Paul M. Rivard
Attorney, Agent, or Firm—Head, Johnson & Kachigian

[57] ABSTRACT

A method for butt welding first and second thermoplastic pipes to each other including the steps of locating the end portions of first and second pipes to be joined in clamps that are moveable towards and away from each other by the application of hydraulic pressure, the pipe end portions being moveable against a facer for trimming the pipe ends at a first predetermined optimum hydraulic pressure, moveable against a heater for heating the pipe ends to a molten state at a second predetermined optimum hydraulic pressure and moveable towards each other while the ends are in a molten state to fuse the pipes at a third predetermined optimum hydraulic pressure, determining the hydraulic pressure required to move the pipe end portions towards each to determine a drag force hydraulic pressure, adding the drag force hydraulic pressure to each predetermined optimum hydraulic pressure to obtain first, second and third operating hydraulic pressures, and butt welding the pipes to each other using the first, second and third determined operating hydraulic pressures.

11 Claims, 2 Drawing Sheets

METHOD FOR BUTT WELDING THERMOPLASTIC PIPE INCLUDING AUTOMATIC DRAG COMPENSATION

BACKGROUND OF THE INVENTION

This invention relates to a method of and apparatus for joining, by heat fusion, lengths of thermoplastic pipe in end-to-end relationship, commonly called "butt fusion". The butt fusion method disclosed herein is of the type that takes place in the field where a plastic pipeline is being installed that requires a length of plastic pipe to be physically axially dragged by the butt fusion apparatus towards the completed portion of a pipeline to which the length of pipe is joined.

Thermoplastic pipe is increasing being used for distribution of natural gas, water, for sewage disposal and many other applications. Thermoplastic pipe has advantages over metal pipe in that it is corrosion resistant and when buried has an exceedingly long life expectancy. Further, plastic pipe is lighter than steel pipe and can be expeditiously thermally fused (butt welded) in successive length thereby eliminating the need for couplings.

Thermoplastic pipe is conveniently joined by means of apparatus having two clamps engageable with the pipes with a system to force the clamps towards or away from each other. When smaller size pipes are being joined, butt fusion machines commonly employ manually moveable clamps. However, when larger size pipes are being butt welded it has become common in the industry to utilize machines wherein the clamps are hydraulically moved with respect to each other. The use of hydraulic energy for displacing one clamp relative to another in the butt fusion of thermoplastic pipe has great advantageous over manually moving the clamps, not only in that it relieves the energy required of a workmen but makes it possible to more accurately and consistently control the entire butt fusion procedure.

As examples of butt fusion machines, reference may be had to the following United States Patents:

| U.S. Pat. No. | INVENTOR | TITLE |
|---|---|---|
| 3013925 | Larson | Method and Means For Welding Thermoplastic Pipes |
| 3552265 | Lucas | Method and Apparatus For Facing Thermoplastic Pipe |
| 3729360 | McElroy | Portable Thermoplastic Pipe Fusion Apparatus |
| 3846208 | McElroy | Combination Pipe Fusion Unit |
| 4352708 | McElroy | Defined Force Fusion Machine For Joining Plastic Pipe |

In more recent years others have disclosed butt fusion apparatus designed to more accurately and predictably control the processes involved in butt fusing plastic pipe. The following three United States Patents are particularly relevant to the present invention and disclosed improvements in earlier butt fusion machines:

| U.S. Pat. No. | INVENTOR | TITLE |
|---|---|---|
| 4,640,732 | Stafford | Apparatus For Fusion Joining of Thermoplastic Pipes |
| 4,957,570 | Jenkins et al | Butt-Welding of Pipes |
| 5,013,376 | McElroy II et al | Programmable Computer Controlled Pipe Fusion Device |

These three previously issued United States patents provide good background for an understanding of the technology to which the present invention is directed and therefore these three patents are incorporated herein by reference.

SUMMARY OF THE INVENTION

A method for butt welding (or butt fusing) first and second thermoplastic pipes to each other is provided. The method includes the steps of locating the end portions of a first and a second pipe to be joined in first and second clamps, at least one of which clamps is moveable towards and away from the other by the application of hydraulic pressure. Butt fusion machines of the type employed in practicing the method of this invention typically include a frame having two clamps. One of the clamps is normally fixed relative to the frame and the other moveable however, in some embodiments both clamps are moveable relative to the frame. In either type of apparatus it is important only that at least one clamp be moveable relative to the other and, in the practice of this invention, that movement of a clamp or clamps relative to each other is accomplished by the application of hydraulic pressure.

The pipe end portions are moveable against a facer for trimming the pipe ends at a first predetermined optimum hydraulic pressure. After the pipe ends are trimmed to provide planar faces that are perpendicular to the pipe axii, the pipe end portions are moved against a heater for heating the pipe ends to molten state, at a second predetermined optimum hydraulic pressure. After heating has been accomplished the pipes are moved apart to withdraw the heater and the pipe end portions are then moved against each other while the ends are in a molten state to fuse and allow the ends to cool below a molten temperature, the pipe portions being moved against each other at a third predetermined optimum hydraulic pressure.

The method includes the step of detecting the hydraulic pressure required to move the pipe end portions towards each other prior to contact of the end portions with a facer, a heater or each other to determine a drag force hydraulic pressure, that is, the amount of hydraulic pressure required to overcome the drag force of physically moving the pipes towards each other.

The next step in practicing the method is adding the drag force hydraulic pressure to each of the first, second and third predetermined optimum hydraulic pressures to obtain first, second and third operating hydraulic pressures.

The method is concluded by butt welding first and second thermoplastic pipes to each other using the first, second and third operating hydraulic pressures. The method of this invention is practiced employing hydraulic circuits utilizing pressure control valves or pressure relief valves to achieve the predetermined hydraulic pressures for each of the steps involved in butt fusing lengths of plastic pipe.

The valves employed in the method of this invention can, in one instance, be pressure reducing valves and in a second embodiment, pressure relief valves. Each of these type valves have the characteristic of providing a pressure output that is determined by two components. The first component is a manually adjustable spring tension component by which an operator manually preselects the optimum hydraulic pressure required for each step in the fusion process which is predetermined according to the diameter, wall thickness and plastic characteristic of the pipes being joined. That is, the operator by manually adjusting spring tension on three valves, either pressure reducing valves or pressure relief valves, can provide, at the output of the three valves, separate hydraulic pressures representative of the predetermined and preferred hydraulic pressures for facing, heating and fusing thermoplastic pipe. Further, in the method of this invention, these predetermined manually adjustable spring tension controlled pressures are supplemented by hydraulic pressure supplied to the control valves, whether the control valves are pressure reducing valves or pressure relief valves to provide three separate operating pressures that are in each instance a summation of a predetermined preferred pressure plus a hydraulic pressure representative of the pressure required to overcome drag forces.

A better understanding of the invention will be obtained from the following description of the preferred embodiment, taken in conjunction with the attached drawings and claims.

DETAILED DESCRIPTION OF THE PREFERRED EMBODIMENTS

Figure 1:
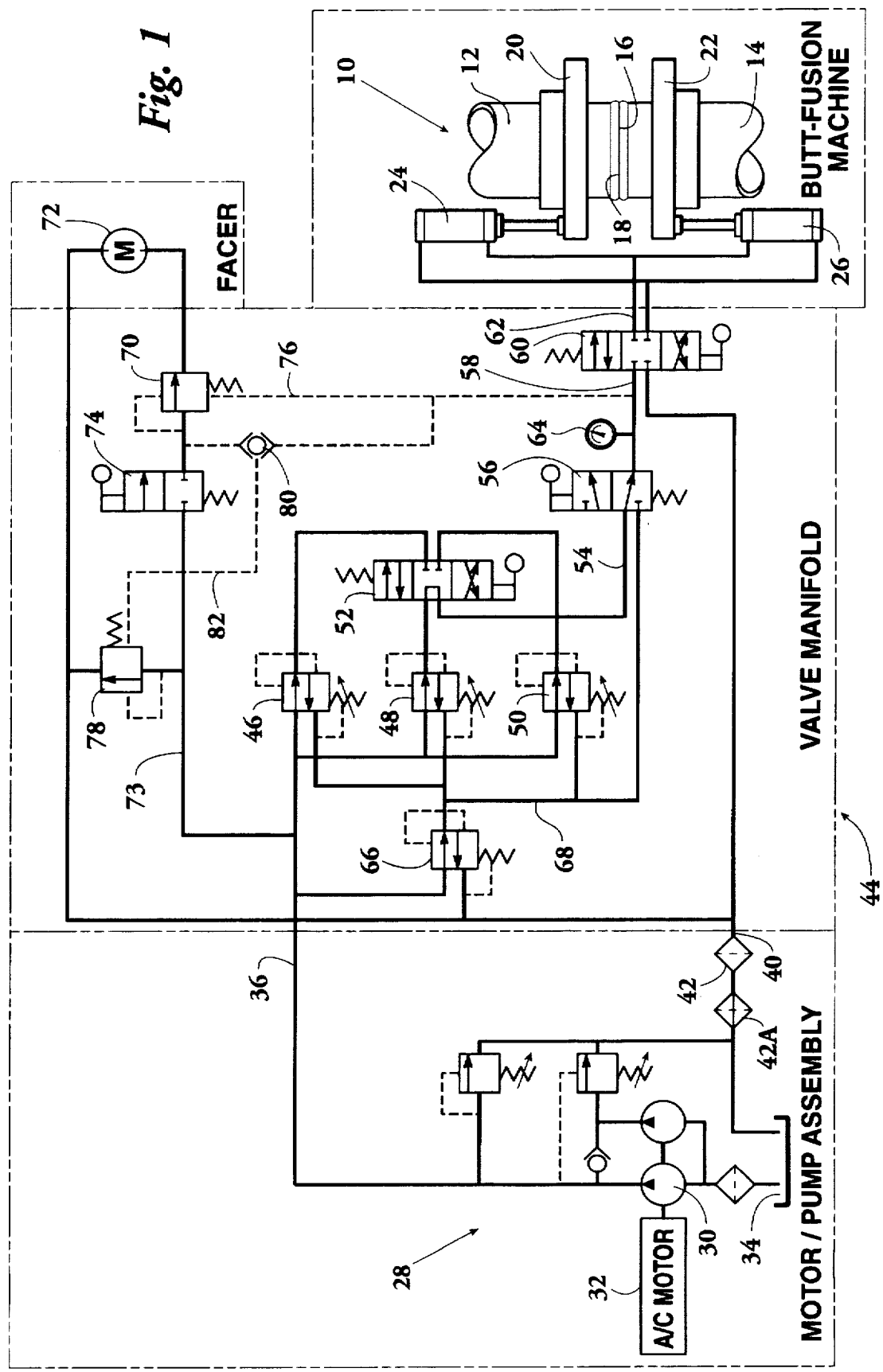
FIG. 1 is a hydraulic schematic showing the apparatus to practice the method of this invention for butt welding lengths of thermoplastic pipe in which the hydraulic system employs pressure reducing valves.
Figure 2:
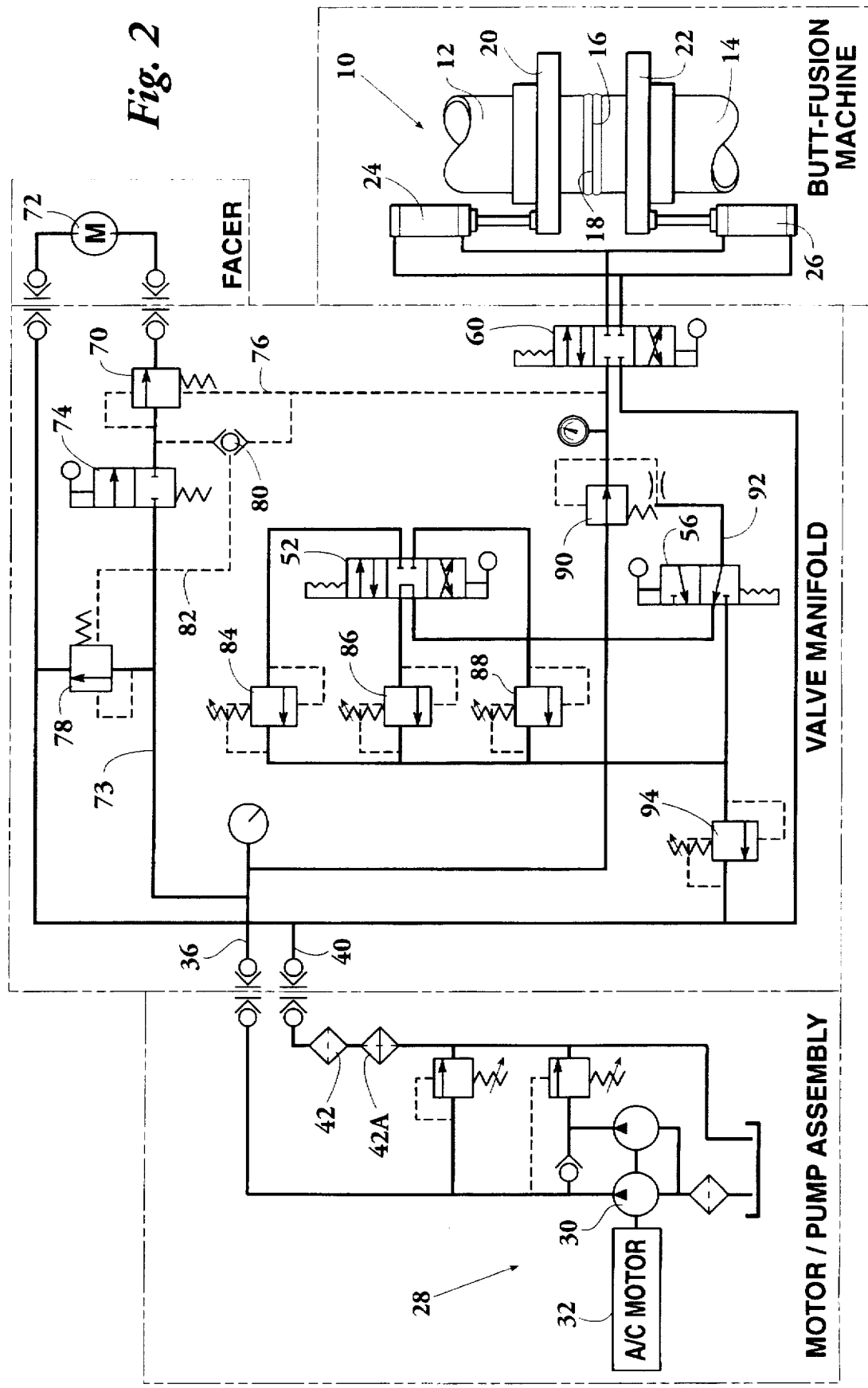
FIG. 2 is an alternate embodiment of the invention showing the hydraulic system wherein the hydraulic circuit employs pressure relief valves.

The invention will be described first with reference to a system that utilizes pressure reducing valves as illustrated in the hydraulic schematic of FIG. 1, after which the alternate embodiment utilizing pressure relief valves as illustrated in FIG. 2 will be described. Referring to FIG. 1, a butt fusion machine is schematically represented by the figure indicated by the numeral 10, the machine being of the type used for butt fusing in end-to-end relationship a first plastic pipe end portion 12 to a second plastic pipe end portion 14. Pipes 12 and 14 are formed of thermoplastic, that is, plastic having the characteristic that it can be thermally fused. The specific function of butt fusion machine 10 is to fuse together end 16 of first pipe 12 to end 18 of second pipe 14. The butt fusion machine 10 characteristically includes a first clamp 20 that releasably engages first pipe end portion 12 and a second clamp 22 that releasably engages second pipe end portion 14. Clamps 20 and 22 are support to a frame (not shown) and are guided so as to maintain the axial alignment of pipe end portions 12 and 14. In the most typically embodiment of a butt fusion machine 10, one of clamps 20 and 22 is held stationary and the other is moveable. In some butt fusion machines, both clamps 20 and 22 may be moveable with respect to each other but, in any event, the ultimate results is the same, that is, the machine 10 supports clamps 20 and 22 so that at least one of them is moveable with respect to the other so that the end portions of two lengths of pipe can be held in such a way that ends 16 and 18 can be moved towards and away from each other while holding the pipe end portions in axial alignment. In many butt fusion machines, rather than one clamp 20 and one clamp 22 each would be represented by two spaced apart clamps, all of which are adapted to releasably secure the end portion of lengths of pipe.

In butt fusion machines adapted for joining relatively small diameter pipe, an example being about 4 inches, clamps 20 and 22 can be moved towards and away from each other manually by a arm that is pivoted to the frame that supports the clamps. However, for a large diameter pipe, most butt fusion machines provide for hydraulically moving clamps 20 and 22 towards and away from each other. For this purpose, a cylinder/piston is utilized with either the piston or the cylinder attached to the frame and the other attached to the moveable clamp. A typical butt fusion machine wherein one of the clamps is stationary, only a single cylinder/piston may be employed but most often two cylinder/pistons are employed, one to each side of the clamp, operating in parallel. In the embodiment shown in FIG. 1, both clamps 20 and 22 are illustrated as being moveable by cylinder/pistons 24 and 26 respectively, however, in the most common commercial application of the invention, one of clamps 20 or 22 would be typically stationary and both of the cylinder/pistons 24 and 26 would be attached to the moveable clamp.

The butt fusion machine 10 as illustrated and described herein is considered to be of known prior art and representative of the practice in the industry of butt fusing plastic pipe and does not form a part of this invention but instead, is illustrative of the basic machine to which this invention is applied. That is, the invention is concerned with properly supplying hydraulic fluid pressure to cylinder/pistons 24, 26 for proper operation of the machine.

A motor/pump assembly is generally indicated by the numeral 28 and is a system for supplying hydraulic fluid pressure. The system includes a hydraulic pump 30 driven by motor 32 which, if electrical energy is available is preferably an electric motor, or if in a remote area where no electrical energy is available can be an engine. Pump 30 draws hydraulic fluid from a sump 34 and provides a source of hydraulic fluid pressure at line 36. Pressure control and regulator valves are employed to insure that the hydraulic pressure on line 36 is maintained within a preset minimum and maximum range. It should be understood that the particular arrangement of the motor/pump assembly 28 is illustrated only for the purposes of indicating that the system of this invention employs a source of hydraulic fluid pressure and the particular arrangement of the motor/pump assembly is not a part of this invention except to say that the system provides a source of positive fluid pressure on line 36 and receives the return of fluid flow to sump 34 on a return line 40. The return fluid passes through a filter 42 and an oil cooler 42A. While not illustrated in FIG. 1, lines 36 and 40 may be supplied with quick disconnect couplings so that the entire motor/pump assembly 28 can be easily connected or disconnected from the rest of the hydraulic system for repair, servicing or for other reasons.

The essence of this invention is contained in the portion of the hydraulic circuit indicated as the "valve manifold" and generally indicated by the numeral 44. The hydraulic components contain within the valve control fluid pressure to cylinder/pistons 24 and 26 to effectively operate butt fusion machine 10.

In order to effectively butt weld two lengths of plastic pipe in axial relationship the pipes are first clamped into position in the machine and then three basic steps are performed on the pipes. First, the opposed ends 16 and 18 of pipes 12 and 14 respectively must be properly faced so that the end surfaces are each in a plane that is perpendicular to the cylindrical axis of a pipe portion 12 or 14. This is accomplished by use of a facer (not seen) which can be either manually, electrically or hydraulically operated. To face the pipe ends 16 and 18 clamps 20 and 22 are moved apart from each other and a facer inserted between pipe ends 16 and 18. The clamps are then moved towards each other, by the application of hydraulic fluid pressure to cylinder/pistons 24 and 26. Pipe ends 16 and 18 must be urged against the opposed surfaces of the pipe facer with a predetermined force range that in turn is directly related to the hydraulic pressure range applied to cylinder/pistons 24, 26. After the ends of the opposed lengths of pipe have been faced and the facer withdrawn, the next step is to raise the ends to molten temperatures. For this purpose, a heater (not shown) is inserted between the ends of the pipe and the pipes are then moved into contact with the heater using a predetermined hydraulic fluid pressure. Finally, after the ends of the pipes have been heated so that they reach the molten state, they are withdrawn from each other, the heater removed and then the pipes are abutted against each other and held until the molten ends have cooled to the solid state, fusing the pipes together. The pressure applied between the pipes during the fusion process is predetermined. Thus three separate steps involve applying three predetermined pressure levels to cylinder/pistons 24, 26. The pressure levels can be accurately predetermined according to the diameter, wall thickness and characteristics of the pipes being fused. For this purpose, as illustrated in FIG. 1, three pressure reducing valves, indicated by the numerals 46, 48 and 50 are employed to define the predetermined pressures for the three separate operations of facing, heating and fusing. The outlet for each of these pressure reducing valves is connected to a three-position manually operated function control valve 52. The position of valve 52 determines the pressure applied to line 54 which is conveyed by way of a calibration mode valve 56 to line 58 which, in turn, passes by way of a direction control valve 60 to line 62 which, in turn, is connected to cylinder/pistons 24, 26. The hydraulic pressure at line 62 can be used to move clamps 20 and 22 towards or away from each other depending upon the position of valve 60. In its center or normal position as illustrated, no movement of the clamps 20 and 22 takes place but when the operator wants to move the clamps in one direction to open them or move the clamps in the direction to close them, the operator manually manipulates valve 60. The function of calibration mode valve 56 will be described subsequently.

Pressure reducing valves 46, 48 and 50 each function by reducing pressure applied to the valve to produce a lower output pressure, the amount of which is determined by two factors. First, by manually manipulating the spring tension on valves 46, 48 and 50, the base pressure output from each of the valves is selected. That is, the operator sets the base output pressure of each of the pressure reducing valves 46, 48 and 50 by manually manipulating the spring tension in each valve, this characteristic being indicated on the drawing by the arrows extending through the springs. This is accomplished by the operator setting function control valve 52 in each of the three selected positions and, with pipes 12 and 14 abutted end-to-end, the preselected pressure for each of the three basic functions of butt fusion is indicated on gauge 64. Thus, whenever a different type of pipe is to be butt fused, that is a pipe that is different in diameter, wall thickness or characteristic of the thermoplastic material of which the pipe is formed, the predetermined pressures required for each of facing, heating and fusing can be preset into the valve manifold 44 by the operator by observing gauges 64 as function control valve 52 is positioned in each of the three basic positions.

In addition to the predetermined force required for the three different steps in butt fusing a pipe there is a fourth force that must be considered and that is, the drag force. When pipes are moved towards each other the actual hydraulic pressure that must be applied to cylinder/pistons 24 and 26 must total the predetermined pressure required for the function being done on the pipes plus whatever hydraulic pressure is necessary to physically move the pipes towards each other, that is, what is referred to as the "drag force". A pressure reducing valve 66, which will be termed a "drag force valve", is of the same type as valves 46, 48 and 50 and is used to compensate for the drag force required in the hydraulic operation of the butt fusion machine. Whereas the forces required for facing, heating and fusion remain consistent for each different diameter, wall thickness and pipe characteristics and which will normally, in the operation of a butt fusion machine, change only when a different type of pipe is being fused, the drag force can change frequently due to varying conditions, such as whether a length of pipe being joined to a pipeline is being drug uphill, drug downhill, drug over a rough surface or a smooth surface, etc. Therefore, the operator must frequently determine the amount of drag force otherwise the proper forces to perform the three basic functions of a pipe fusion operation cannot be applied to cylinder/pistons 24, 26. To determine the drag force required to move a length of pipe in position to be butt fused, after the end portions of the pipes are clamped in clamps 20 and 22 and the pipe ends are spaced apart from each other, and without a facer or heater interposed between the pipes, the operator moves the calibration mode valve 56 to the downward position. This supplies the output of drag force valve 66, which appears on line 68 to line 58 and thereby to direction control valve 60. The operator moves direction control valve 60 to move the pipes towards each other. The operator then manually adjusts the spring tension of pressure reducing valve 66 until the pipes start to move towards each other. This the operator visually observes. By manually adjusting the spring tension of valve 66 the operator establishes that the pressure appearing on line 68 at the output is that pressure required to overcome drag.

After making such mechanical adjustment of valve 66, the calibration mode valve 56 is permitted to return to its normal position as illustrated in FIG. 1 so that the established output pressure of drag force valve 66 is applied to line 68 is thereby applied to pressure reducing valves 46, 48 and 50. The pressure at line 68 functions in the pressure reducer valves to augment the force applied by the springs within the valves and therefore to define the pressure output of each of the pressure reducing valves, that is, the pressure reducing valves 46, 48 and 50 are of the type, commercially available, that produce a pressure output that is determined by two factors, the spring tension that is mechanically adjustable by the operator augmented by hydraulic control pressure applied from line 68.

Therefore, the pressure output of each of valves 46, 48 and 50 is determined by a summation of the forces required to move the pipe towards each other (drag force), plus the force required to accomplish the intended function, that is, either to face the pipes, heat the pipes, or fuse the pipes.

During the course of the daily operation of the system drag compensation must be frequently adjusted into the circuit. This is accomplished by engaging calibration mode valve 56 and then manually drag force valve 66 to the new pressure that starts to move the pipe to be joined. No adjustments are necessary to pressure reducing valves 46, 48 and 50 until a different pipe, that is a pipe having a different diameter, wall thickness or plastic characteristic is to be fused. Drag force valve 66 therefore automatically compensates and adds the new drag pressure to pressure control valves 46, 48 and 50.

An additional enhancement to the hydraulic circuitry of FIG. 1 is the use of a sequential valve 70. A typical butt fusion operation may include a facer that is driven by a hydraulic motor 72. Hydraulic pressure from motor/pump assembly 28 is available from line 36 by way of line 73 to a facer actuator valve 74. Without some circuit modification, upon moving facer actuator valve 74 to the open position to connect to actuator motor 72, all the pressure and flow in the system could go to motor 72 if the facer motor had no load present on it. This would, in essence, take the pressure away from the hydraulic cylinders and therefore lose proper facing pressure. The incorporation of sequential valve 70 functions to maintain sufficient pressure in the system so that the pressure at the hydraulic cylinders (displayed on gauge 64) will always be maintained independent of the amount of load seen on facer motor 72. Thus, provision of sequential valve 70, in essence provides that the hydraulic cylinders 24, 26 have "pressure priority" over the pressure of facer motor 72. This is so since pressure at the clamp cylinders is connected by way of line 76 to sequential valve 70. As the facer actuator valve 74 is open to operate facer motor 72, sequential valve 70 will not open until the pressure seen at pressure control valve 70 is greater than the pressure supplied by line 76 plus the spring bias pressure adjusted into valve 70. This will always maintain the hydraulic pressure at cylinders 24, 26 as set by pressure reducing valves 46, 48, 50 and 66 as heretofore described. Sequential valve 70 acts as a variable pressure control valve to maintain pressure based on demand by the hydraulic cylinders 24 and 26.

Another feature of the circuit of FIG. 1 is the provision of a variable system pressure relief valve 78. In a normal operation a typical pressure relief valve is used in the circuit which is set at a relieving pressure higher than the highest operating pressure expected. Instead, in the illustrated arrangement employing the variable system pressure relief valve, the pressure at which relief of excessive pressure appearing at line 36 is automatically adjusted to eliminate the need for the operator to set this valve and will always maintain a relieving pressure slightly greater than the pressure required by the system. This is accomplished as follows: System pressure is determined either by hydraulic cylinders 24, 26 or by the hydraulic motor. Shuttle check valve 80 selects the highest of these two pressures and connects this signal to the control port of variable system pressure relief valve 78. The pressure supplied by way of fluid line 82 is in addition to the spring bias pressure which establishes the relieving pressure of valve 78. The main hydraulic system pressure will be controlled by the setting of valve 78. As demanded operating pressure from either the cylinder or motor circuit changes, the main system pressure changes due to the ability of variable system pressure control valve 78 to adjust automatically. The use of the variable system pressure control valve 78 along with shuttle check valve 80 allows the hydraulic system to automatically adjust its operating pressure. This has the beneficial effect of not requiring an operator to change or monitor this pressure setting. If pressure is not needed in the system as sensed by the variable system pressure relief valve 78, then the pressure will be reduced accordingly. Potentially, less heat will be generated in the hydraulic system and components will have a longer life. In addition, reduced oil cooling may be required.

FIG. 2 shows an alternate embodiment of the invention wherein, rather than the use of pressure reducing valves 46, 48, 50 and 66, as means to control the cylinder pressure and provide improved drag compensation, pressure relief valves are used, that is, in the embodiment of FIG. 2, pressure relief valves are employed. Used in the circuit are many of the same components of the circuit of FIG. 1, and such components having the same number as has been previously assigned. The circuit of FIG. 2 includes the use of a differential pressure sensing valve 90 to control the pressure at direction control valve 60. The maximum pressure and therefore the speed of actuation of cylinder/pistons 24 and 26 is controlled by the combination of the spring pressure set in valve 90 along with the hydraulic pressure supplied through line 92 extending from valve 56.

The hydraulic circuit of FIG. 2 provides a system in which the flow from pump 30 passes by way of line 36 into the valve manifold and is present at differential pressure sensing valve 90. This valve is normally open and hydraulic fluid flows through the valve until the pressure at the outlet port is greater than the pressure on the control port plus the spring biased pressure. The operator adjusts valve 84, 86 and 88 according to the predetermined control pressures for the particular pipe to be fused, that is, the spring adjustments on the valve 84, 86 and 88 are selected to provide the predetermined hydraulic pressure necessary for the predetermined force applied to urge the pipes into contact with a facer, with a heater, or into contact with each other for joint fusion. The function control valve 52 is used to select which pressure will be applied to the differential pressure sensing valve 90 by way of calibration mode valve 56. Pressure relief valve 94 is similar to drag force valve 66 of FIG. 1, that is, pressure relief valve 94 controls the pressure in the port cavities of pressure relief valves 84, 86 and 88. This additional pressure in the control ports of these valves has the effect of increasing the amount of set pressure above the spring setting to compensate for force required to overcome drag when moving pipes 12 and 14 towards each other.

The spring force on pressure relief valve 94 is set by the operator. With calibration mode valve 56 in the downward position, the spring tension of valve 94 is adjusted so that when direction control valve 60 is moved to force the pipes towards each other and the first movement of the pipes is visually detected the drag force is established. Thereafter, when calibration mode valve 56 is returned to its normal position as illustrated, pressure from valve 94 is then applied to pressure relief valves 84, 86 and 88 to add this drag force addition to the force imparted when these valves are utilized for moving pipes 12 and 14 towards each other.

The other components of FIG. 2 that have the same numbers as those of FIG. 1 perform the same functions as in FIG. 1.

In summary, the invention utilizes manually adjustable control valves to provide an automated and improved system for butt fusing thermoplastic pipe. The operator maintains full control of the equipment but certain functions have been automated. The hydraulic systems of FIGS. 1 and 2 provide pressure control through sequential valve 70 when auxiliary functions such as a hydraulic facer motor 72 is being used simultaneously with the actuation of hydraulic cylinders 24 and 26 that could otherwise effect the hydraulic cylinder pressure. The main system pressure is automatically controlled by variable system pressure relief valves 78 which reduces the need for the operator to monitor the system pressure.

The invention has been described in which the system automatically compensates for drag force in determining operating hydraulic pressures for facing, heating and fusing. The invention could be practiced employing only two of such pressures. For instance, an operator could face the pipes by visually observing the procedure and use the method of this disclosure only for heating or fusing or only for fusing alone.

Pressure reducing valves 46, 48, 50 and 66 as illustrated and described in FIG. 1 are commercially available from Vickers. Valve Model PRV1-10-K-0-6 is an example of a commercially available valve that can be used in constructing the circuit of FIG. 1. Pressure relief valves 84, 86, 88 and 94 as illustrated and described in FIG. 2 are commercially available, such as a Model No. RV1-10-K-0-9 as manufactured by Vickers.

The other valves utilized in the system are commonly commercially available valves well known to any practitioner in the art of hydraulic systems.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method for butt welding first and second thermoplastic pipes to each other employing optimum hydraulic pressures comprising the steps of:
   (1) locating end portions of a first and a second pipe to be joined in first and second clamps, at least one of which clamps is moveable towards and away from the other by the application of hydraulic pressure, the pipe end portions being moveable against a facer for trimming the pipe ends at a first predetermined optimum hydraulic pressure, the pipe end portions being moveable against a heater for heating the pipe ends to a molten state at a second predetermined optimum hydraulic pressure and the pipe end portions being moveable towards each other while the ends are in a molten state to fuse the pipes together at a third predetermined optimum hydraulic pressure;
   (2) determining the hydraulic pressure required to move the pipe end portions towards each other prior to contact of the end portions with a facer, a heater or each other to determine a drag force hydraulic pressure;
   (3) hydraulically adding the drag force hydraulic pressure as determined in step (2) to each of said first, second and third predetermined optimum hydraulic pressures of step (1) to obtain first, second and third operating hydraulic pressures; and
   (4) butt welding first and second thermoplastic pipes to each other using the first, second and third operating hydraulic pressures determined in step (3).

2. The method for butt welding first and second thermoplastic pipes to each other according to claim 1 wherein the step of determining a drag force hydraulic pressure includes determining the hydraulic pressure required to initially move the pipe end portions towards each other.

3. The method for butt welding first and second thermoplastic pipes to each other according to claim 1 wherein said first, second and third predetermined optimal hydraulic pressures are set employing adjustable first, second and third pressure reducing valves.

4. The method for butt welding first and second thermoplastic pipes to each other according to claim 3 wherein each of said first, second and third pressure reducing valves is, at least in part, adjusted by the application of hydraulic signal pressure derived from said drag force hydraulic pressure.

5. A method for butt welding first and second thermoplastic pipes to each other employing optimum hydraulic pressures comprising the steps of:
   (1) locating end portions of first and second pipes to be welded in first and second clamps, at least one of which is moveable towards the other by the application of hydraulic pressure, the pipe end portions being moveable towards each other while the ends are in a molten state to fuse at an optimum hydraulic pressure predetermined by dimensions and characteristics of the pipe;
   (2) detecting the hydraulic pressure required to move the pipe end portions towards each other to determine a drag force hydraulic pressure;
   (3) hydraulically adding the drag force pressure as determined in step (2) to said predetermined optimum hydraulic pressure to obtain an operating hydraulic pressure; and
   (4) butt welding first and second thermoplastic pipes having ends that are at molten temperature by forcing the molten ends against each other employing said operating hydraulic pressure.

6. A method for butt welding first and second thermoplastic pipes to each other according to claim 5 wherein said operating hydraulic pressure is attained by use of a pressure reducing valve wherein a selected reduced hydraulic pressure is supplied at the output of the valve determined by the combination of a manually adjustable spring tension member that determines said optimum hydraulic pressure and a supplemented hydraulic force added by said drag force hydraulic pressure.

7. A method of butt welding first and second thermoplastic pipes to each other according to claim 5 wherein said operating hydraulic pressure is attained by use of a pressure relieving valve wherein a selected reduced hydraulic pressure is supplied at an output of the valve determined by a manually adjustable spring tension that determines said optimum hydraulic pressure and a supplemented hydraulic force added by said drag hydraulic pressure.

8. The method for butt welding first and second thermoplastic pipes to each other according to claim 5 including the step of supplying a source of hydraulic pressure as employed in steps (2), (3) and (4); and
   providing a variable system pressure relief valve to selectably control the pressure of said source of hydraulic pressure.

9. A method for butt welding first and second thermoplastic pipes to each other according to claim 8 including the step of providing a hydraulically actuated facer having a facer motor that can be selectably actuated to operate the facer employing said source of hydraulic pressure;
   detecting the pressure available at said source of hydraulic pressure; and
   by means of a priority valve, applying hydraulic pressure to said facer motor only when the detected pressure available at said source of hydraulic pressure equals or exceeds a predetermined minimum pressure necessary to obtain said operating hydraulic pressure.

10. A method for butt welding first and second thermoplastic pipes to each other comprising the steps of:
   locating end portions of a first and a second pipe to be joined in first and second clamps, at least one of which clamps is moveable towards and away from the other by the application of hydraulic pressure, the pipe end portions being moveable against a facer for trimming the pipe ends at a first predetermined optimum hydraulic pressure, the pipe end portions being moveable against a heater for heating the pipe ends to a molten state at a second predetermined optimum hydraulic pressure and the pipe end portions being moveable towards each other while the ends are in a molten state to fuse the pipes together at a third predetermined optimum hydraulic pressure;

determining the hydraulic pressure required to move the pipe end portions towards each other prior to contact of the end portions with a facer, a heater or each other to determine a drag force hydraulic pressure;

adding the determined drag force hydraulic pressure to each first, second and third predetermined optimum hydraulic pressures to obtain first, second and third operating hydraulic pressures that are set in first, second and third pressure reducing valves; and butt welding first and second thermoplastic pipes to each other using the first, second and third operating hydraulic pressures as set in said first, second and third pressure reducing valves.

11. A method for butt welding first and second thermoplastic pipes to each other comprising:

locating end portions of first and second pipes to be welded in first and second clamps, at least one of which is moveable towards the other by the application of hydraulic pressure, the pipe end portions being moveable towards each other while the ends are in a molten state to fuse at an optimum hydraulic pressure predetermined by dimensions and characteristics of the pipe;

detecting the hydraulic pressure required to move the pipe end portions towards each other to determine a drag force hydraulic pressure;

hydraulically adding said drag force pressure to said predetermined optimum hydraulic pressure to obtain an operating hydraulic pressure, said operating hydraulic pressure being attained by use of a pressure reducing valve wherein a selected reduced hydraulic pressure is supplied at the output of the valve determined by the combination of a manually adjustable spring tension member that determines said optimum hydraulic pressure and a supplementing hydraulic force added by said drag force hydraulic pressure; and butt welding first and second thermoplastic pipes having ends that are at molten temperature by forcing the molten ends against each other employing said operating hydraulic pressure.

* * * * *